US009525997B2

(12) United States Patent
Rainer et al.

(10) Patent No.: US 9,525,997 B2
(45) Date of Patent: Dec. 20, 2016

(54) METHOD AND APPARATUS FOR MANAGING INTERNATIONAL MOBILE SUBSCRIBER IDENTITY

(71) Applicant: AT&T Intellectual Property I, LP, Atlanta, GA (US)

(72) Inventors: Brian Keith Rainer, Lawrenceville, GA (US); Matthew Traye Kenerly, Mableton, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 384 days.

(21) Appl. No.: 14/088,594

(22) Filed: Nov. 25, 2013

(65) Prior Publication Data
US 2015/0148032 A1 May 28, 2015

(51) Int. Cl.
*H04W 8/20* (2009.01)
*H04W 12/04* (2009.01)
*H04W 8/24* (2009.01)

(52) U.S. Cl.
CPC ............ *H04W 8/205* (2013.01); *H04W 8/245* (2013.01); *H04W 12/04* (2013.01)

(58) Field of Classification Search
CPC ........ H04W 8/26; H04W 12/06; H04W 12/04; H04W 8/205; H04W 4/24; H04W 8/183; H04W 60/00; H04W 8/04; H04W 8/18; H04W 8/245; H04L 61/6054; H04L 63/0853; H04M 15/715; H04M 15/8038; H04M 15/7556
(Continued)

(56) References Cited

U.S. PATENT DOCUMENTS

| 6,445,929 B2 | 9/2002 | Chandnani et al. |
| 7,359,704 B1 | 4/2008 | Dizdarevic et al. |

(Continued)

FOREIGN PATENT DOCUMENTS

| EP | 2451135 A1 | 5/2012 |
| EP | 2555547 A1 | 2/2013 |

(Continued)

OTHER PUBLICATIONS

Agarwal, Sachin et al., "Operator-based over-the-air M2M wireless sensor network security", Intelligence in Next Generation Networks (ICIN), 2010 14th International Conference on IEEE, 2010. http://www.isti.tu-berlin.de/fileadmin/fg214/Papers/ICIN_M2M_Ravi.PDF.

(Continued)

*Primary Examiner* — Thai Vu
(74) *Attorney, Agent, or Firm* — Guntin & Gust, PLC; Jay H. Anderson

(57) ABSTRACT

Aspects of the subject disclosure may include, for example, responsive to a mode of operation being a reseller mode, providing a second international mobile subscriber identity to a mobile communication device to cause the mobile communication device to store the second international mobile subscriber identity in the universal integrated circuit card and to cause the mobile communication device to delete the first international mobile subscriber identity from the universal integrated circuit card. Responsive to the mode of operation being an agency mode, a third international mobile subscriber identity and authentication keys can be provided to the mobile communication device to cause the mobile communication device to store the third international mobile subscriber identity and the authentication keys in the universal integrated circuit card without deleting the first (Continued)

international mobile subscriber identity from the universal integrated circuit card. Other embodiments are disclosed.

20 Claims, 7 Drawing Sheets

(58) Field of Classification Search
USPC ..... 455/418, 419, 420, 588, 433, 435.1, 558
See application file for complete search history.

(56) References Cited

U.S. PATENT DOCUMENTS

| | | | |
|---|---|---|---|
| 7,979,066 | B2 | 7/2011 | Pan |
| 8,463,258 | B2 | 6/2013 | Parsons et al. |
| 2005/0075106 | A1 | 4/2005 | Jiang |
| 2010/0136967 | A1* | 6/2010 | Du ............... H04W 8/205 455/432.3 |
| 2010/0159924 | A1 | 6/2010 | Lagerman et al. |
| 2011/0081906 | A1 | 4/2011 | Jiang |
| 2012/0172089 | A1 | 7/2012 | Bae et al. |
| 2013/0072257 | A1* | 3/2013 | Evans ............ H04W 12/04 455/558 |
| 2013/0095795 | A1 | 4/2013 | Shi |
| 2013/0102306 | A1 | 4/2013 | Sachanandani |
| 2013/0115942 | A1 | 5/2013 | Kuc et al. |
| 2013/0165075 | A1* | 6/2013 | Rishy-Maharaj ..... H04W 12/04 455/411 |
| 2013/0171988 | A1 | 7/2013 | Yeung et al. |
| 2013/0203465 | A1 | 8/2013 | Ali et al. |

FOREIGN PATENT DOCUMENTS

| | | |
|---|---|---|
| KR | 20080088739 | 10/2008 |
| WO | 98/35521 | 8/1998 |
| WO | 2011/023008 | 3/2011 |
| WO | 2013/000348 | 3/2013 |

OTHER PUBLICATIONS

Edlund, Lasse, "Secure and confidential application on UICC", Master of Science Thesis, Stockholm, Sweden 2009.

Johannessen, T.H., "Identity management in general and with attention to mobile gsm-based systems", Telektronikk 103.3/4 (2007): 31. http://www.telenor.com/wp-content/uploads/2012/05/T07_3-4.pdf#page=33.

Sirett, William G. et al., "Design, installation and execution of a security agent for mobile stations", Smart Card Research and Advanced Applications. Springer Berlin Heidelberg, 2006. 1-15. http://www.wysiwyatfashion.com/Files/WSJMKEMKM13.pdf.

* cited by examiner

400

METHOD AND APPARATUS FOR MANAGING INTERNATIONAL MOBILE SUBSCRIBER IDENTITY

FIELD OF THE DISCLOSURE

The subject disclosure relates to a method and apparatus for managing international mobile subscriber identity.

BACKGROUND

Mobile communication devices often travel into areas that are outside of a service region of a home mobile network operator of the mobile devices. Roaming is often utilized to enable communications in such out of service regions. However, in some circumstances a subscriber may be operating in a country or coverage region in which long term roaming is either not permitted or not feasible.

BRIEF DESCRIPTION OF THE DRAWINGS

Reference will now be made to the accompanying drawings, which are not necessarily drawn to scale, and wherein.

DETAILED DESCRIPTION

Figure 1:
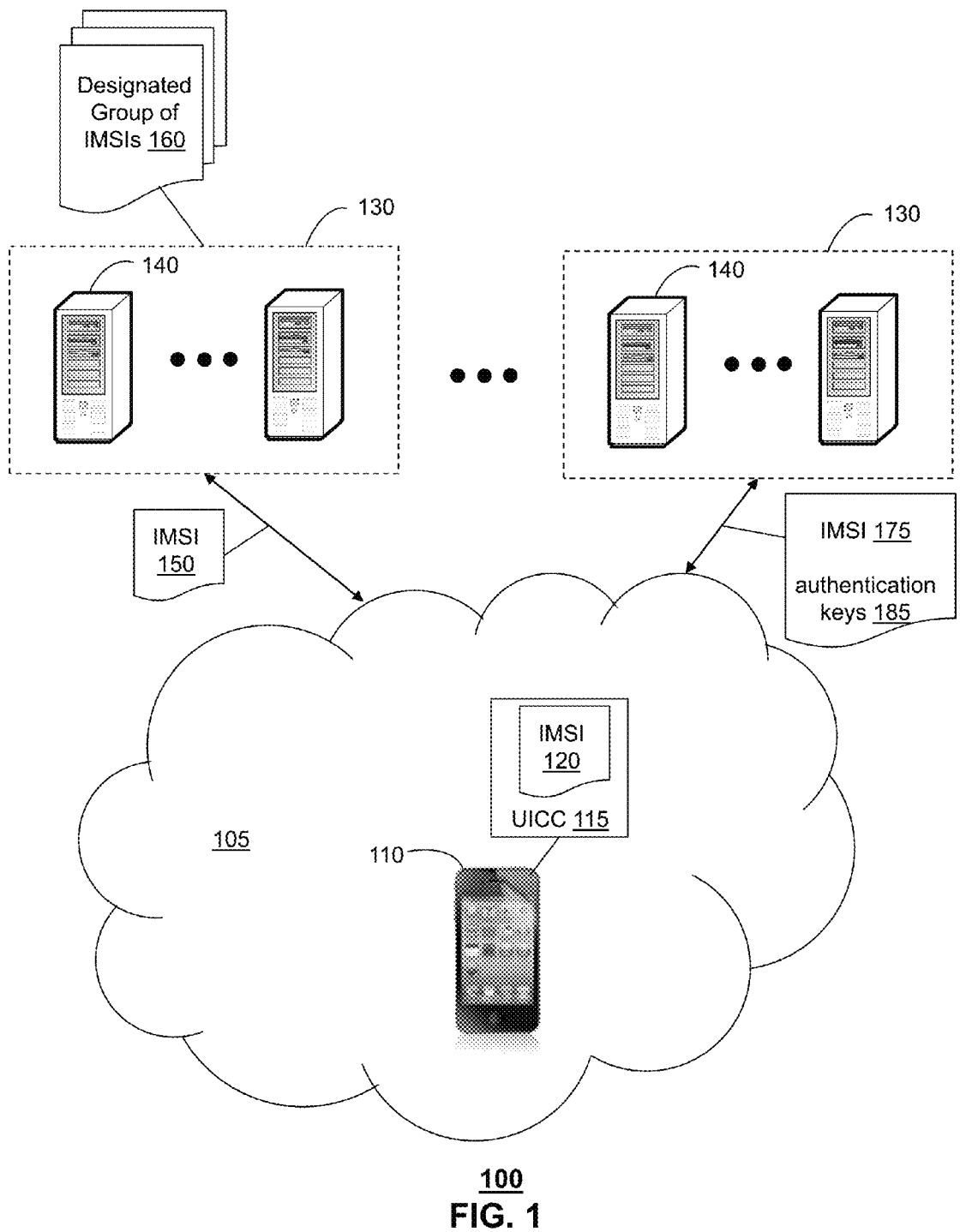
FIG. 1 depicts an illustrative embodiment of enabling mobile services to be provided, such as to a subscriber operating outside of his or her home mobile operating network service region.

The subject disclosure describes, among other things, illustrative embodiments for providing mobile services to mobile communication devices that may be operating outside of a service region of their home mobile operating network. The mobile services can be provided by way of managing the distribution of International Mobile Subscriber Identity (IMSI) to Universal Integrated Circuit Cards (UICCs) of the mobile communication devices. In one or more embodiments, a determination can be made as to the available operation mode for a mobile communication device and based on the available mode either a new IMSI can be provided to a UICC of the mobile communication device (overwriting an existing IMSI at the UICC) or a new IMSI along with authentication keys can be provided to the UICC to be stored without deleting the existing IMSI. The new IMSI or the combination of another new IMSI with the authentication keys can then be utilized by the UICC for registration to a mobile network operator or to a target mobile network operator. Other embodiments are described in the subject disclosure.

One or more of the exemplary embodiments can provide an automated process to execute a re-IMSI of a UICC (e.g., provisioning the UICC with a new IMSI) or a re-credentialing of a UICC (e.g., provisioning the UICC with a new IMSI and authentication keys).

For example, upon activation of a subscription, the UICC of a mobile communication device can be provisioned in a network, and various network elements (e.g., a Home Location Register (HLR)) can be provisioned with the corresponding data to enable mobile services to be provided to the subscriber via the mobile communication device. For instance, in the HLR, the IMSI and the authentication keys for the UICC can be provisioned to enable the UICC to register and authenticate with the network. Once the UICC is activated, a subscriber account can be analyzed or otherwise accessed to determine if the subscriber account supports a particular mode of operation, such as roaming only for network access with other mobile network operators or a reseller and/or agency mode of operation for network access. In this example, if a reseller mode only is supported, then a Mobile Country Code (MCC) and a Mobile Network Code (MNC), which the UICC registers with, can be matched against or otherwise indexed to a target list that is available for the particular subscriber account so that a new IMSI can be selected to execute a re-IMSI, as appropriate, to that particular mobile network operator. In one or more embodiments, this mobile network operator can have already provided an IMSI range (e.g., a block of IMSI numbers) available for performing re-IMSI to UICCs, such as of this subscriber account. In one or more embodiments, the mobile network operator can be executed network changes or otherwise made network adjustments such that network traffic for communications associated with the IMSI range is routed to a host core mobile network. In one or more embodiments, the re-IMSI can be performed by way of an Over-The-Air programming (OTA) messaging (which includes the new IMSI) to the UICC. In one or more embodiments, the new IMSI can be stored by the UICC and an existing IMSI can be overwritten by the UICC. An IMSI update can then be performed to the HLR and related data bases based on the new IMSI that has been distributed to this particular UICC. The UICC can then be refreshed which forces a registration of the UICC utilizing the new IMSI. In one or more embodiments, the determination of the operation mode, the selection of the new IMSI, the receiving of the OTA with the new IMSI, the storage of the new IMSI, the overwriting of the existing IMSI, the IMSI update for the HLR and other network elements, the refreshing of the UICC and/or the UICC registration using the new IMSI can be performed automatically without user intervention or user input.

In one or more embodiments, if the account supports an agency mode (alone or in addition to the reseller mode), the process can utilize the MCC and MNC for the mobile network operator that the UICC is registered on and can determine if the UICC should roam, re-IMSI in a reseller mode, or be re-credentialed to support the agency mode. If the UICC is to be re-credentialed, a new IMSI and authentication keys for that mobile network operator can be provided, such as via OTA, to the UICC. In one or more embodiments, the new IMSI and authentication keys can be stored in a separate profile from the existing set of credentials on the UICC. In this example, the UICC can refresh and use this new set of credentials to register on the target mobile network operator. If this registration successfully occurs on the target mobile network operator, then the HLR and related network elements on the host core network for the UICC can be updated based on the new IMSI. Continuing with this example, the subscription can reside in the core network of the target mobile network operator. In one or more embodiments, the target mobile network operator can provide a set of credentials (e.g., new IMSI and authentication keys) for each re-credential transaction. In one or more embodiments, if the registration to the target mobile network operator does not complete successfully, then the UICC can fallback to its existing or bootstrap subscription and roam on the target mobile network operator or another available mobile network operator. In one or more embodiments, a retry mechanism for the OTA of data to the UICC can be performed, such as in response to detecting that the UICC has failed to successfully complete the registration.

One embodiment of the subject disclosure is a method that includes determining, by a system including a processor, a mobile country code and a mobile network code for a mobile communication device based on a first registration associated with a universal integrated circuit card of mobile communication device, where the universal integrated circuit card stores a first international mobile subscriber identity. The method can include identifying, by the system, a mode of operation for the mobile communication device according to a subscriber account associated with the mobile communication device, where the subscriber account designates the mode of operation to be at least a roaming mode, a reseller mode or an agency mode. The method can include, responsive to the mode of operation being the reseller mode, selecting, by the system, a second international mobile subscriber identity from among a group of international mobile subscriber identities that are designated for a mobile network operator, where the selecting of the second international mobile subscriber identity is according to the mobile country code and the mobile network code. The method can include, responsive to the mode of operation being the reseller mode, providing, by the system, the second international mobile subscriber identity to the mobile communication device to cause the mobile communication device to store the second international mobile subscriber identity in the universal integrated circuit card, where the providing of the second international mobile subscriber identity to the mobile communication device causes the mobile communication device to delete the first international mobile subscriber identity from the universal integrated circuit card. The method can include, responsive to the mode of operation being the reseller mode, providing, by the system, the second international mobile subscriber identity to a home location register to facilitate establishing communications for the mobile communication device.

One embodiment of the subject disclosure is a method that includes determining, by a system including a processor, a mobile network code for a mobile communication device based on a first registration associated with a universal integrated circuit card of mobile communication device, where the universal integrated circuit card stores a first international mobile subscriber identity. The method can include identifying, by the system, a mode of operation for the mobile communication device according to a subscriber account associated with the mobile communication device, where the subscriber account designates the mode of operation to be at least a reseller mode or an agency mode. The method can include, responsive to the mode of operation being the reseller mode, providing, by the system, a second international mobile subscriber identity to the mobile communication device to cause the mobile communication device to store the second international mobile subscriber identity in the universal integrated circuit card, where the providing of the second international mobile subscriber identity to the mobile communication device causes the mobile communication device to delete the first international mobile subscriber identity from the universal integrated circuit card. The second international mobile subscriber identity can be selected from among a group of international mobile subscriber identities that are designated for a mobile network operator. The selecting of the second international mobile subscriber identity can be according to the mobile network code. The method can include, responsive to the mode of operation being the agency mode, providing, by the system, a third international mobile subscriber identity and authentication keys to the mobile communication device to cause the mobile communication device to store the third international mobile subscriber identity and the authentication keys in the universal integrated circuit card without deleting the first international mobile subscriber identity from the universal integrated circuit card.

One embodiment of the subject disclosure includes a computer-readable storage device comprising instructions which, responsive to being executed by a processor, cause the processor to perform operations that include storing a first international mobile subscriber identity on a universal integrated circuit card of a mobile communication device. The processor can, responsive to a mode of operation for the mobile communication device determined to be a reseller mode, receive a first over-the-air programming message that includes a second international mobile subscriber identity. The processor can, responsive to the mode of operation for the mobile communication device determined to be the reseller mode, store the second international mobile subscriber identity in the universal integrated circuit card and deleting the first international mobile subscriber identity from the universal integrated circuit card. The second international mobile subscriber identity can be selected from among a group of international mobile subscriber identities that are designated for a mobile network operator. The selecting of the second international mobile subscriber identity can be according to a mobile network code. The processor can, responsive to the mode of operation for the mobile communication device determined to be an agency mode, receive a second over-the-air programming message that includes a third international mobile subscriber identity and authentication keys. The processor can, responsive to the mode of operation for the mobile communication device determined to be the agency mode, store the third international mobile subscriber identity and the authentication keys in the universal integrated circuit card without deleting the first international mobile subscriber identity from the universal integrated circuit card. The mode of operation for the mobile communication device can be determined according to a subscriber account associated with the mobile communication device.

FIG. 1 depicts an illustrative embodiment of a system 100 that enables mobile communication devices 110 (only one of which is shown) to utilize mobile services, including voice, video and/or data services, even when the mobile communication device is outside of a service region of a home mobile network operator of the mobile communication device. The system 100 enables selective distribution of new IMSIs (e.g., a re-IMSI) or selective distribution of a new IMSI and authentication keys (e.g., re-credentialing) so that a mobile communication device can obtain a registration and does not need to continue roaming in the network 105. Mobile communication device 110 is illustrated as a smart phone, but the mobile communication device can be any type of mobile device capable of wireless communications, such as a tablet, a laptop, a vehicle communication system, and so forth.

The network 105 can enable wireless communications utilizing various technologies such as of Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so forth.

The system 100 can include a number of different mobile network operators 130 that can be independent mobile service providers, including mobile network operators that are assigned with MCC and MNC for various networks. The mobile network operators can utilize various devices 140 (e.g., routers, switches, digital subscriber line access multiplexers (DSLAMs), and so forth) and various techniques for providing mobile services. In one or more embodiments, the mobile network operators can have inter-service agreements between each other that provides for the re-IMSI and/or re-credential processes described herein. These inter-service agreements can be reciprocal meaning that both parties (e.g., a pair of mobile network operators) are provided with the same benefits of the agreement so as to allow subscribers of each of the mobile network operators to be provided with the option for a re-IMSI or re-credential. In other embodiments, the inter-service agreements can be non-reciprocal in that subscribers of only one of the mobile network operators is provided with the re-IMSI and re-credential benefit.

In one or more embodiments, the mobile communication device 110 can include a UICC 115 that is provisioned with an IMSI 120, such as upon registration of the UICC with its home mobile network operator. The UICC 115 can be various types of smart cards including a Subscriber Identity Module (SIM) card or a removable user identity (R-UIM) card. The UICC 115 can be a removable card or can be integrated with the mobile communication device 110. The UICC 115 can includes various components, such as a processor, memory, and input/output circuits, and can include various software such as a SIM application, a USIM application, ISIM application, CSIM application, and so forth. The UICC 115 can be used for identifying subscriber services, executing programs, storing subscriber data, and so forth.

In one or more embodiments, the mobile communication device 110 can receive an IMSI 150, such as via an OTA message (e.g., utilizing short message service (SMS) messaging or protocol), although other methods of provisioning the mobile communication device 110 with the IMSI 150 can also be utilized, including other wireless communication techniques and/or wired communications. The receipt of the IMSI 150 can be in response to a determination (e.g., by a network server or by device 110) that the desired mode of operation for the mobile communication device 110 is a reseller mode when the mobile communication device is outside of the service region of its home mobile network operator. This determination can be made based on various factors and techniques including an analysis of a subscriber account associated with the mobile communication device 110. The subscriber account can designate, or otherwise define, the mode of operation for the mobile communication device to be one or more of a roaming mode, a reseller mode, or an agency mode. These modes of operation can be exclusive or can be in combination, such as a subscriber account that allows for both a reseller mode and an agency mode when the mobile communication device seeks mobile services in a service region that is outside of the service region of its home mobile network operator. Other factors can also be used in this determination, such as cost, mobile network operator resources, stored user preferences, service provider inter-party agreements, and so forth. The received IMSI 150 can be stored by the UICC 115, which can include overwriting or otherwise deleting the IMSI 120 from the UICC.

In one or more embodiments, the IMSI 150 can be selected from among a group of IMSIs 160 which are designated for one or more mobile network operators, such as assigning blocks of IMSI numbers to different mobile network operators where these blocks are reserved for use in the re-IMSI process that is being described herein with respect to the IMSI 150. In one or more embodiments, the appropriate IMSI can be selected from the group of IMSIs 160 according to the MCC and/or MNC associated with the UICC.

If a determination is made that the appropriate mode of operation for the mobile communication device 110 is an agency mode (e.g., based on a review of the subscriber account), then the mobile communication device 110 can receive IMSI 175 along with authentication keys 185. The IMSI 175 and the authentication keys 185 can be received via an OTA message (e.g., utilizing SMS messaging), although other methods of provisioning the mobile communication device 110 with the IMSI 175 and the authentication keys 185 can also be utilized, including other wireless communication techniques and/or wired communications. The received IMSI 175 and authentication keys 185 can be stored by the UICC 115. In one or more embodiments, the UICC can continue to store the IMSI 120 while also storing the IMSI 175 and authentication keys 185 in a separate profile.

The UICC 115, having either the IMSI 150 or the IMSI 175 (along with the authentication keys 185) can perform a registration, such as without user intervention or user input to enable the mobile communication device to obtain mobile services in network 105, such as from a target mobile network operator 130. In one or more embodiments, the mobile communication device 110 can engage in roaming, such as via the target mobile network operator or another mobile network operator, if there is a detection of a failure to register with the target mobile network operator utilizing the IMSI 175 and the authentication keys 185. In one or more embodiments, the re-IMSI or re-credential can be performed to enable a UICC registration without providing any notice to the user during the process.

In one or more embodiments, the registration by the UICC 115 causes a network element on a host core network to be updated with the IMSI 150. In one or more embodiments, responsive to the mode of operation being the agency mode, a failure of the UICC 115 to register with a target mobile network operator utilizing the IMSI 175 and the authentication keys 185 can be detected, and the IMSI 175 and the authentication keys 185 can be re-transmitted to the mobile communication device 110 as a result. In one or more embodiments, network adjustments can be made (prior to an OTA provisioning of IMSI 150 to the mobile communication device 110) to enable or otherwise facilitate routing of traffic (associated with the group of IMSIs 160) to a host core network.

Figure 2:
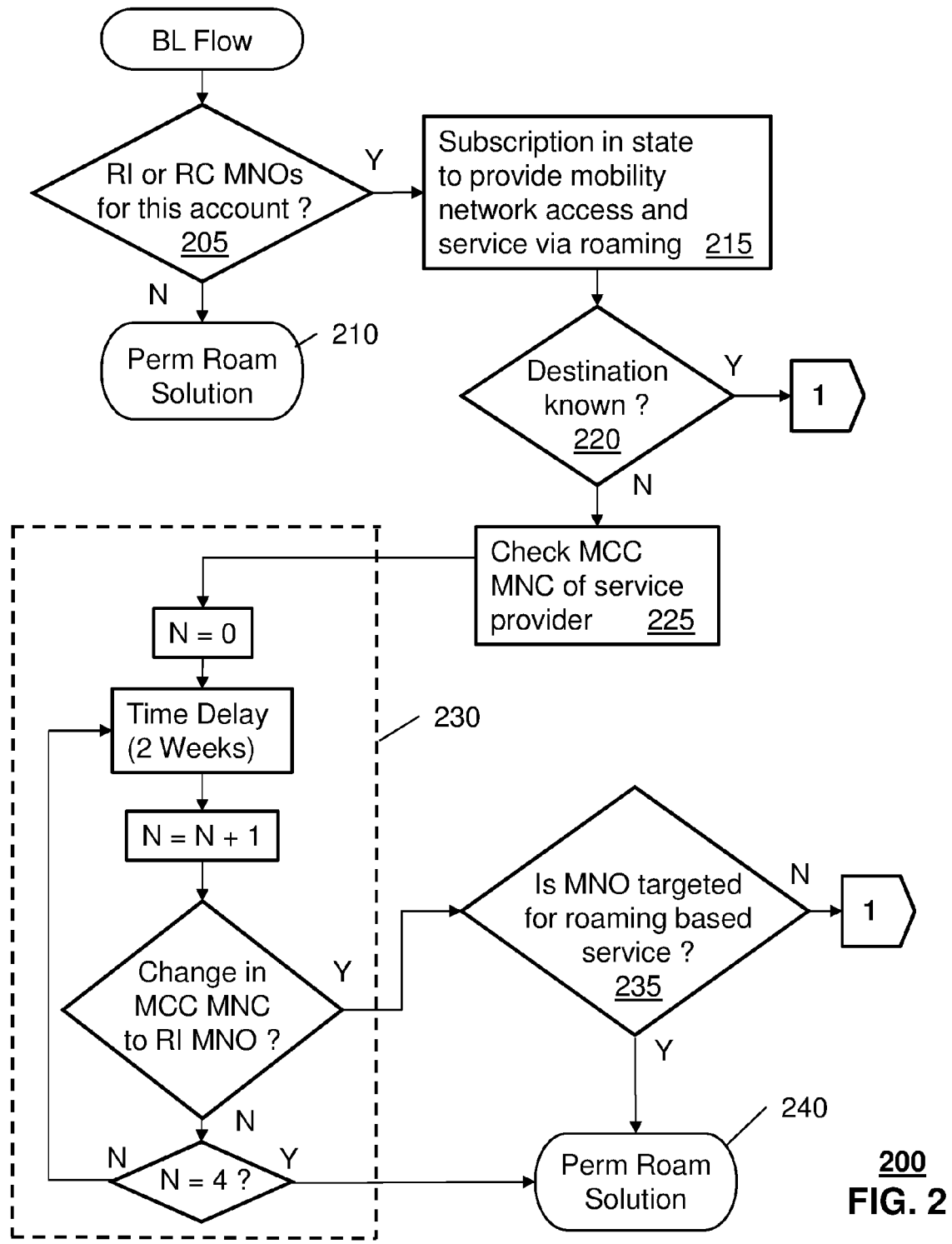
FIGS. 2-4 depict illustrative embodiments of methods used in portions of the system described in FIG. 1.
Figure 3:
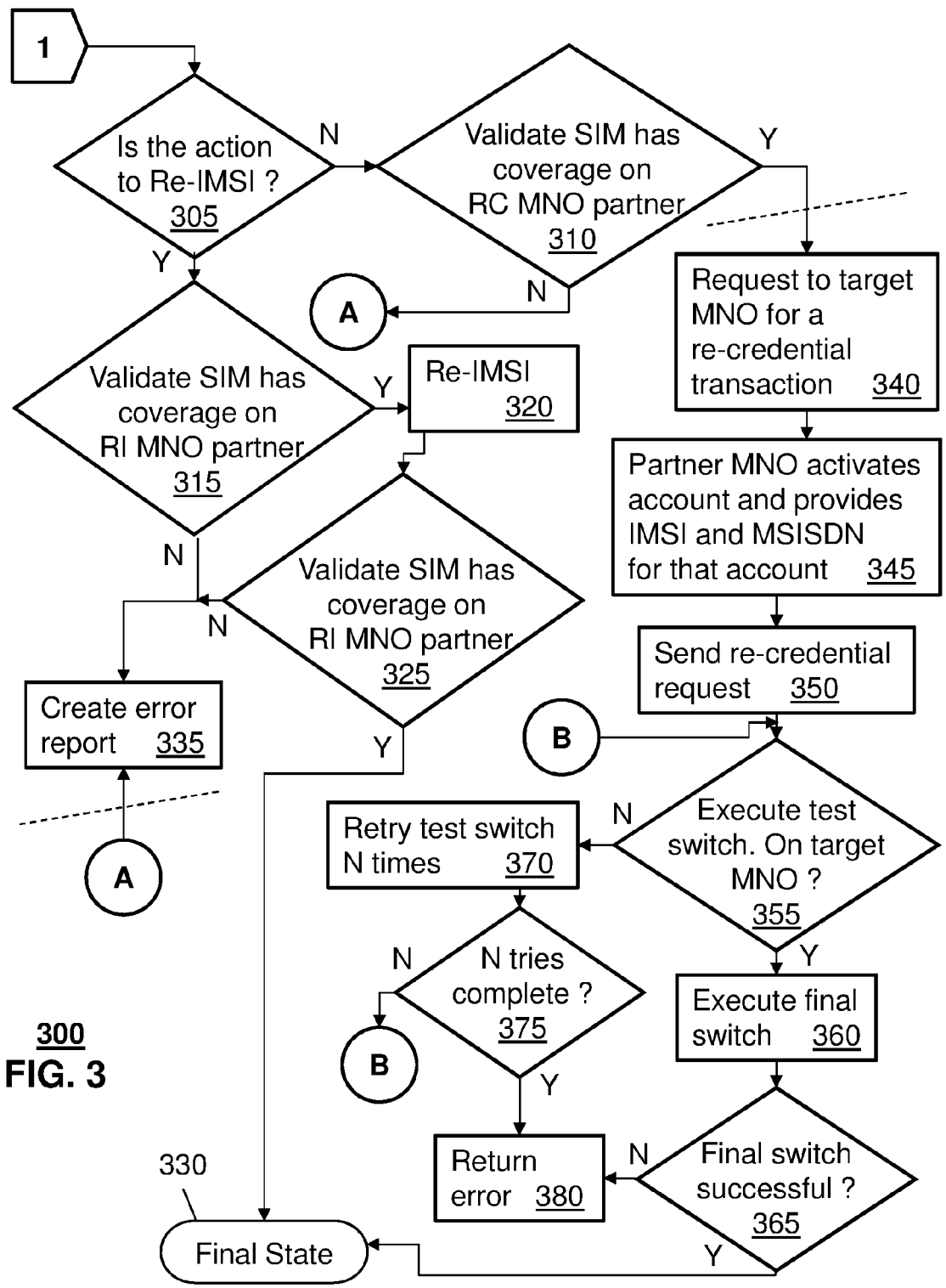

FIGS. 2-3 depict an illustrative embodiment of methods 200 and 300 used by system 100 for performing a re-IMSI or a re-credential based on service provider rules, such as a mode of operation indicated in a subscriber account. Method 200 can begin where the subscription is in a state to provide mobility network access and service. At 205-215, the mode of operations (reseller allowing for re-IMSI or agency allowing for re-credential) as designated by the subscriber account can be determined.

At 220-240 a potential destination for the mobile device can be considered and monitoring for a change in the MCC and MNC can be performed which may result in utilizing roaming rather than a re-IMSI or re-credential. In one embodiment, for accounts that are destined for a country or region in which the UICC will potentially undergo a re-IMSI or a re-credential, a roaming agreement between service providers can be established so that the mobile communication device can at least temporarily operate via roaming. In the event of a re-IMSI or re-credential failure or until the transaction is completed, the mobile communication device can be provided service in a roaming mode. In one or more embodiments, until a change in MCC and MNC is detected, the new MCC and MNC can be monitored and a determination can be made if this MCC and MNC is for a re-IMSI partner that is enabled. A change in the registered network MCC and MNC can be detected for example by monitoring SS7 traffic or validating status on HLRs, HSSs, or IMS elements among others.

At 305-315, a validation of coverage for re-IMSI partners or for re-credential partners can be determined. This can include the MCC and MNC of the mobile network operator that the subscriber is registered on being periodically checked until it matches that of the target mobile network operator (for re-credentialing) or of the target mobile network operator (for re-IMSIing).

At 320-335 this can result in the re-IMSI being performed for the mobile communication device or an error report being created. At 340-350, a re-credential request and account activation can be performed. At 355-380, test switching and final switching can be performed to wither implement the re-credential of the mobile communication device or generate an error report.

Figure 4:
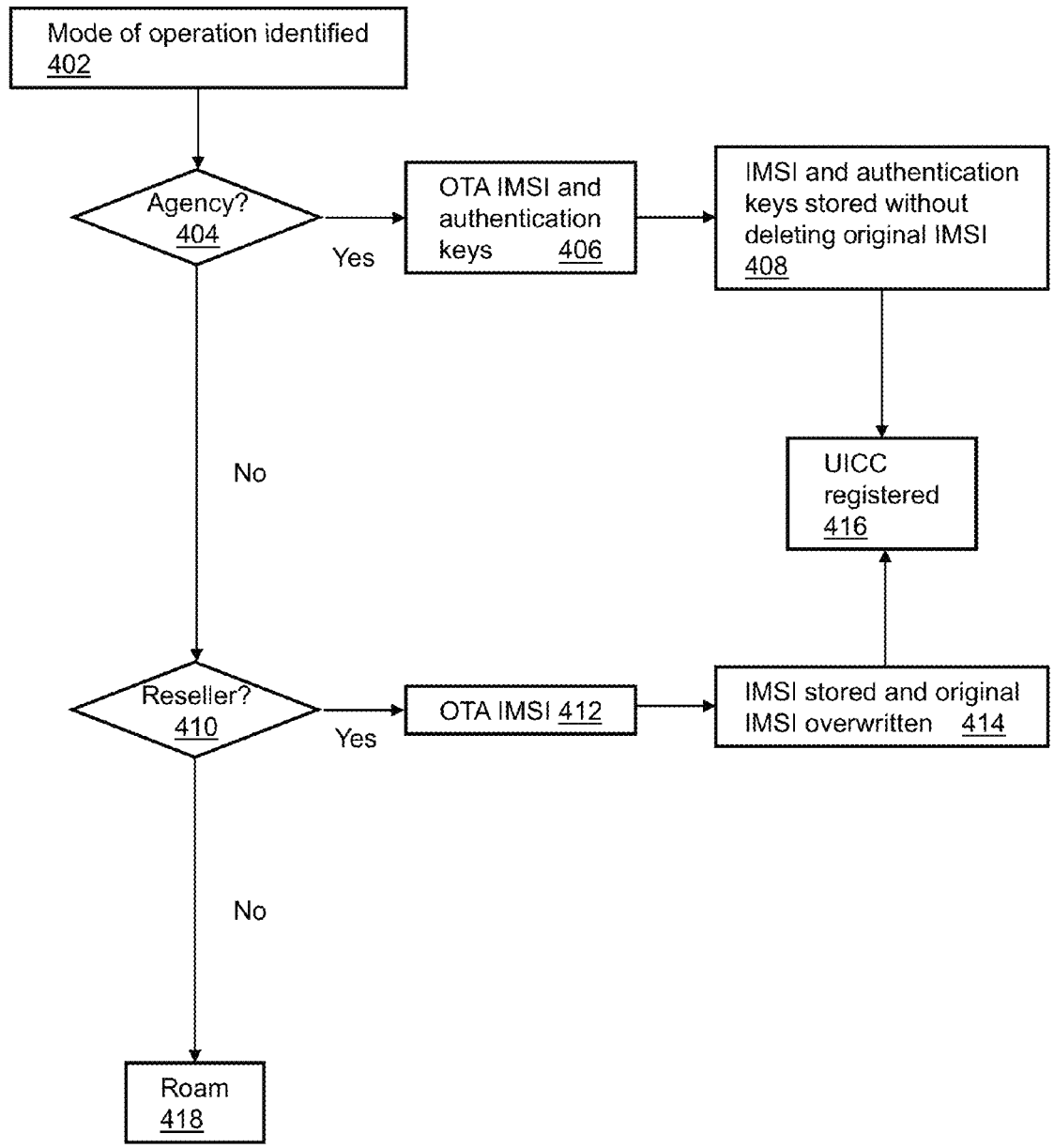

FIG. 4 depicts an illustrative embodiment of a method used for providing mobile services to the mobile communication device 110. At 402, a mode of operation for the mobile communication device can be identified or otherwise determined, such as according to a subscriber account associated with the mobile communication device, although other factors can be used in this determination in addition to the subscriber account or in place of the subscriber account, including mobile network operator resources, existing agreements between service providers, stored user preferences, mobile communication device capabilities, and so forth. In one embodiment, the subscriber account can designate the mode of operation to be a roaming mode, a reseller mode or an agency mode, where the designation can be exclusive or non-exclusive. At 404, if the mode of operation is determined to be an agency mode then at 406, a new IMSI along with authentication keys (or other credentials to be utilized in an authentication process) can be provided to the mobile communication device 110, such as via OTA messaging using SMS protocol. At 408, the UICC 115 can receive these new credentials (e.g., IMSI 175 and authentication keys 185) and can store them without deleting the existing IMSI stored in the UICC. Method 400 can then proceed to 416 where the UICC attempts to register utilizing the new credentials (e.g., IMSI 175 and authentication keys 185). In one embodiment, if this registration on the target mobile network operator via the new credentials is successful, then the HLR and various network elements on the host core network for the UICC can be updated to indicate the use of IMSI 175. In one embodiment, the subscription can reside in the core network of the target mobile network operator and the target mobile network operator can provide a set of credentials (e.g. a new IMSI and new authentication keys) for each re-credential transaction. In one embodiment, the UICC can engage in roaming, such as on the target mobile network operator or another mobile network operator, if the registration according to the new credentials is unsuccessful. Re-transmit mechanisms, utilizing various triggers, such as time dependent triggers, failure notices, and so forth, can be utilized with the provisioning of the IMSI 150 and/or the IMSI 175 (e.g., along with the authentication keys).

If on the other hand at 410, the mode of operations is determined to be a reseller mode then at 412 a new IMSI (e.g., IMSI 150) can be provided to the mobile communication device 110, such as via OTA messaging using SMS protocol. The IMSI can be selected from a block of IMSIs designated for a particular mobile network operator according to the MCC and/or MNC associated with the UICC 115. At 414, the UICC 115 can receive the IMSI 150 and can store it while also overwriting or otherwise deleting the existing IMSI (e.g., IMSI 120). Method 400 can then proceed to 416 where the UICC attempts to register utilizing the new IMSI 150. Method 400 can also proceed to 418 in the event that the mode of operation is designated as roam only.

Figure 5:
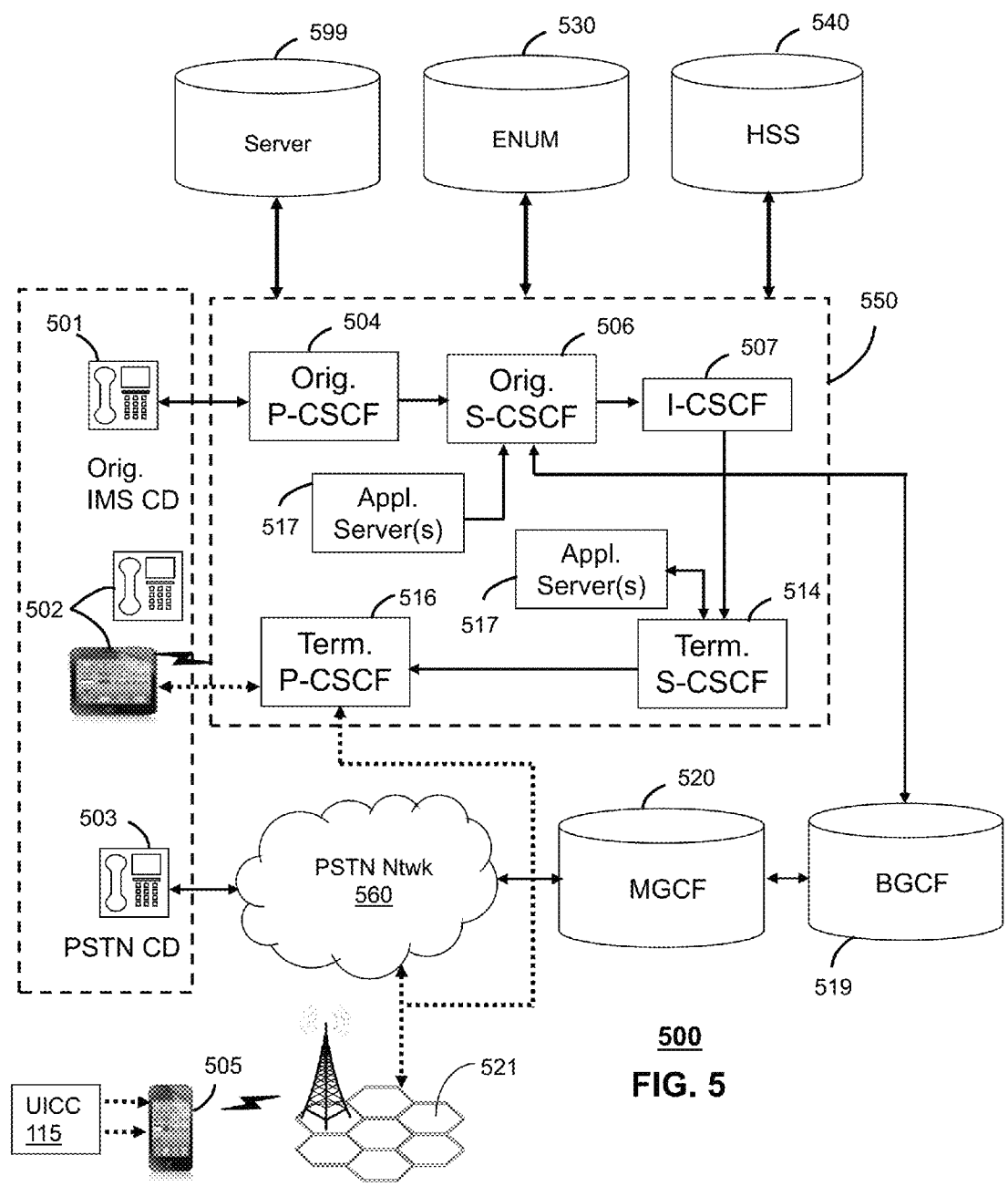
FIG. 5 depicts an illustrative embodiment of communication system that provides communication services through distribution of IMSIs and/or authentication keys.
Figure 6:
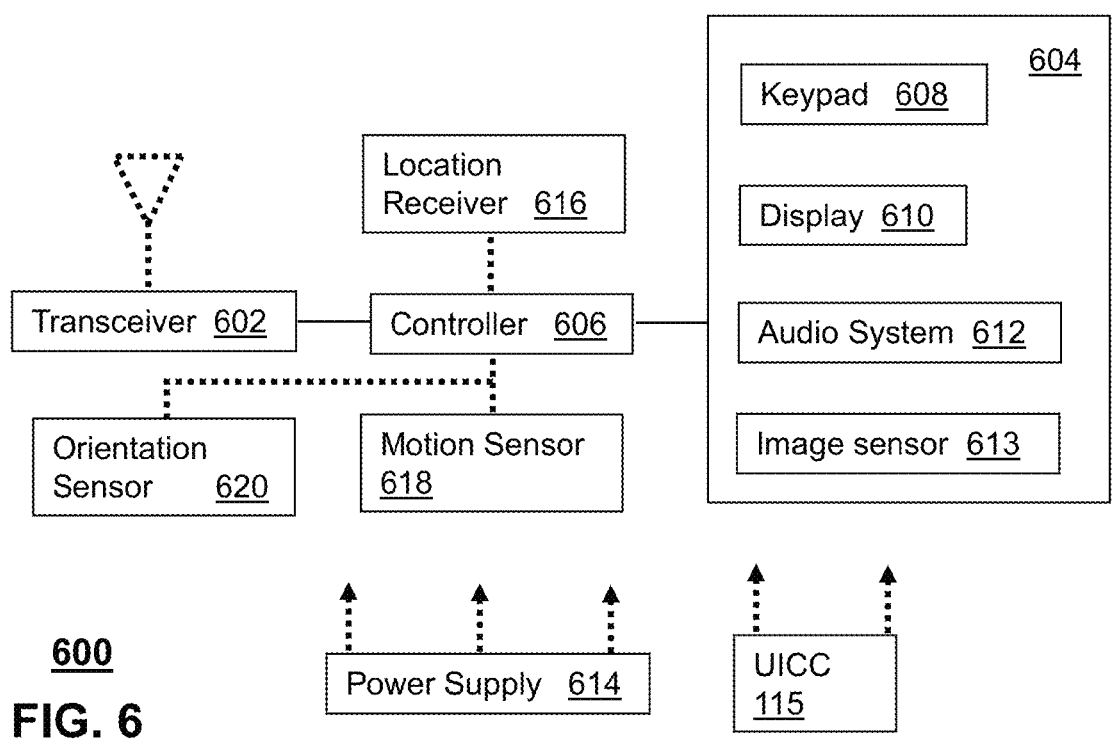
FIG. 6 depicts an illustrative embodiment of a communication device that can operate outside of its home mobile operating network service region.

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 as another representative embodiment of communication system 500 to provide mobile services via a process that includes a re-IMSI or a re-credential. For example, the system 500 can establish mobile services utilizing either the IMSI 150 or the IMSI 175 which has been distributed to the UICC 115 according to the mode of operation described in the subscriber account of the mobile communication device. Updates can be received by various elements of the network 500, such as the Home Subscriber Server (HSS) 540, when the IMSI 150 or the IMSI 175 is stored and utilized by the UICC 115.

Communication system 500 can comprise the HSS 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

In one or more embodiments, the server 599 can analyze or otherwise access a subscriber agreement to determine a mode of operation (e.g., roaming, resell, or agency) to be employed for a mobile communication device (e.g., device 505) that is seeking to access mobile services (e.g., voice, video and/or data) in a network that is outside of a service region of the devices home mobile network operator. In one or more embodiments, the server 599 can receive and store the group of IMSIs 160 (in FIG. 1) for distribution to mobile communication devices. In one or more embodiments, the server 599 can generate and transmit an OTA message that includes either the IMSI 150 or the IMSI 175 (e.g., along with the authentication keys) depending on the mode of operation to be utilized. In one or more embodiments, the server 599 can monitor for unsuccessful registrations by the mobile communication devices and can facilitate roaming and/or can initiate a retransmission of the IMSI 150 and/or the IMSI 175 (e.g., along with the authentication keys).

The server 599 can also be an integral part of the application server(s) 517 performing the re-IMSI and/or re-credential procedures described herein.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
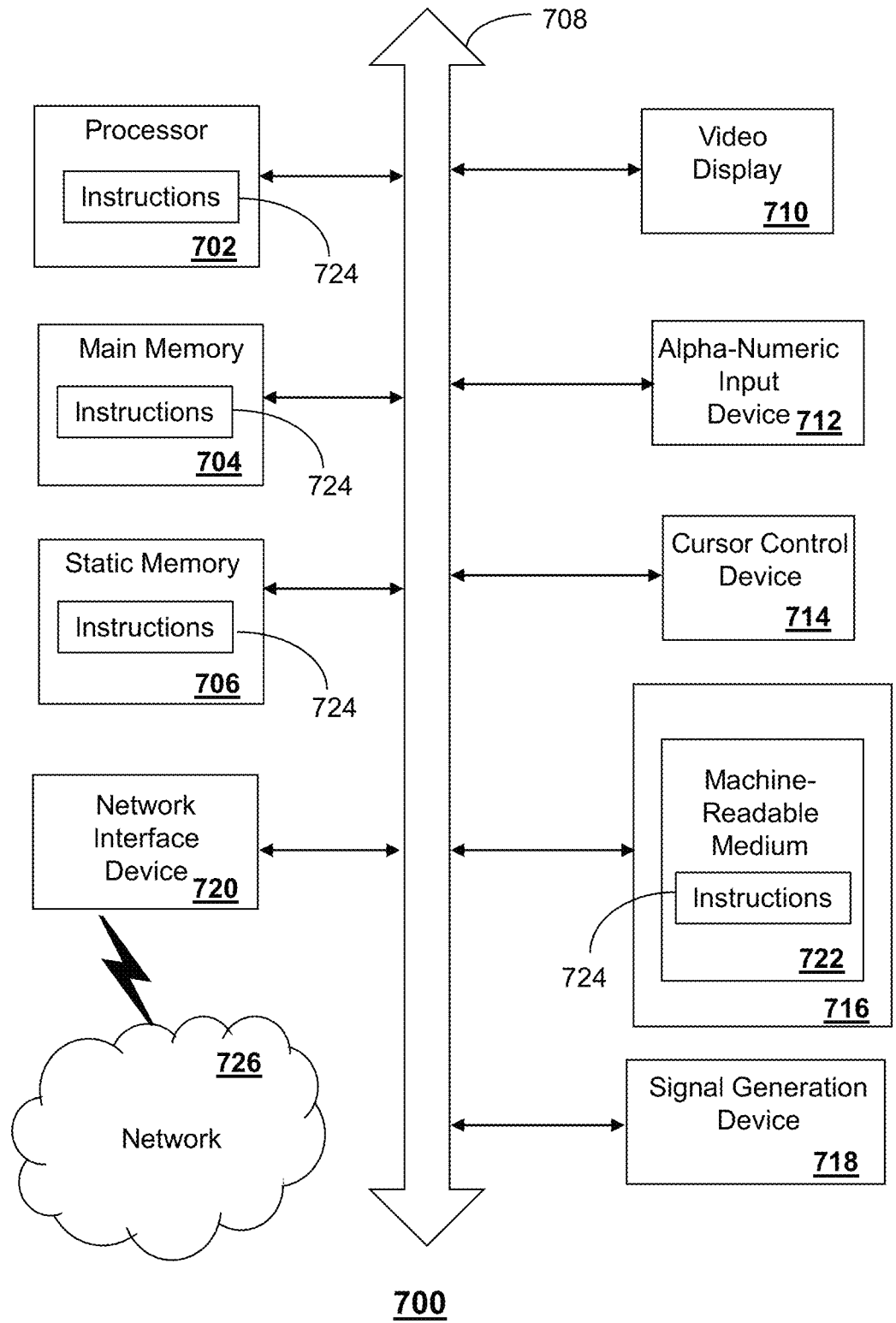
FIG. 7 is a diagrammatic representation of a machine in the form of a computer system within which a set of instructions, when executed, may cause the machine to perform any one or more of the methods described herein.

FIG. 7 depicts an illustrative embodiment of a communication device 700. Communication device 700 can serve in whole or in part as an illustrative embodiment of the devices depicted in system 100 and 500, including mobile communication device 110, network elements 140, and so forth. Communication device 700 can include UICC 115, which can be removable or integrated with the device 700. As explained herein, the UICC 115 can store IMSI 120, can receive and store IMSI 150 while deleting IMSI 120, or can store IMSI 175 along with authentication keys 185 while also storing IMSI 120 in a separate profile. The UICC 115 can provide for registration with a network via the IMSI 150 or registration with a network via the IMSI 175 and authentication keys 185 so that device 700 is provided mobile services even when outside of a service region of the home mobile network operation associated with IMSI 120.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing the UICC 115, which can be used for other purposes in addition to storing the IMSI and authentication keys, such as identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

In one or more embodiments, authorization from the mobile network operator and/or the target mobile network operator can be obtained prior to commencing (or during) the re-IMSI or re-credential processes to enable a mobile communication device operating outside of a service region of its home mobile network operator to access mobile services, including voice, video and/or data services.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the mobile communication device 110, the UICC 115, the network element(s) 140, the server 599 and so forth, in order to manage the distribution of IMSIs and/or authentication keys to enable mobile services to be provided to mobile communication devices even when outside of a service region of a home mobile network operator. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

determining, by a processing system including a processor, a mobile country code and a mobile network code for a mobile communication device based on a first registration associated with a universal integrated circuit card of the mobile communication device, wherein the universal integrated circuit card stores a first international mobile subscriber identity;

identifying, by the processing system, a mode of operation for the mobile communication device according to a subscriber account associated with the mobile communication device, wherein the subscriber account designates the mode of operation to be at least a roaming mode, a reseller mode or an agency mode;

responsive to the mode of operation being the reseller mode, selecting, by the processing system, a second international mobile subscriber identity from among a group of international mobile subscriber identities that are designated for a mobile network operator, wherein the selecting of the second international mobile subscriber identity is according to the mobile country code and the mobile network code;

responsive to the mode of operation being the reseller mode, providing, by the processing system, the second international mobile subscriber identity to the mobile communication device to cause the mobile communication device to store the second international mobile subscriber identity in the universal integrated circuit card, wherein the providing of the second international mobile subscriber identity to the mobile communication device causes the mobile communication device to delete the first international mobile subscriber identity from the universal integrated circuit card;

responsive to the mode of operation being the reseller mode, providing, by the processing system, the second international mobile subscriber identity to a home location register to facilitate establishing communications for the mobile communication device; and responsive to the mode of operation being the agency mode, providing, by the processing system, a third international mobile subscriber identity and authentication keys to the mobile communication device to cause the mobile communication device to store the third international mobile subscriber identity and the authentication keys in the universal integrated circuit card without deleting the first international mobile subscriber identity from the universal integrated circuit card.

2. The method of claim 1, wherein the providing of one of the second or third international mobile subscriber identity to the mobile communication device is via over-the-air programming messaging utilizing short message service messaging.

3. The method of claim 1, wherein the providing of the second international mobile subscriber identity to the mobile communication device responsive to the mode of operation being the agency mode causes a second registration of the universal integrated circuit card for the establishing of the communications utilizing a target mobile network operator, and wherein the second registration is performed without user intervention.

4. The method of claim 3, wherein the second registration causes a network element on a host core network to be updated with the second international mobile subscriber identity.

5. The method of claim 1, wherein the providing of the second international mobile subscriber identity to the mobile communication device responsive to the mode of operation being the reseller mode causes a second registration of the universal integrated circuit card for the establishing of the communications, and wherein the second registration is performed without user intervention.

6. The method of claim 1, comprising providing, by the processing system, network adjustments to enable routing of traffic associated with the group of international mobile subscriber identities to a host core network.

7. The method of claim 6, wherein the mobile communication device is integrated with a vehicle communication system.

8. The method of claim 1, comprising:
detecting, by the processing system, a failure of the universal integrated circuit card to register with a target mobile network operator utilizing the third international mobile subscriber identity and the authentication keys; and
providing, by the processing system, roaming via the target mobile network operator for the mobile communication device responsive to the detecting of the failure to register with the target mobile network operator.

9. The method of claim 1, comprising:
detecting, by the processing system, a failure of the universal integrated circuit card to register with a target mobile network operator utilizing the third international mobile subscriber identity and the authentication keys; and re-transmitting, by the processing system, the third international mobile subscriber identity and the authentication keys to the mobile communication device responsive to the detecting of the failure to register with the target mobile network operator.

10. A method comprising:
determining, by a system including a processor, a mobile network code for a mobile communication device based on a first registration associated with a universal integrated circuit card of mobile communication device, wherein the universal integrated circuit card stores a first international mobile subscriber identity;
identifying, by the system, a mode of operation for the mobile communication device according to a subscriber account associated with the mobile communication device, wherein the subscriber account designates the mode of operation to be at least a reseller mode or an agency mode;
responsive to the mode of operation being the reseller mode, providing, by the system, a second international mobile subscriber identity to the mobile communication device to cause the mobile communication device to store the second international mobile subscriber identity in the universal integrated circuit card, wherein the providing of the second international mobile subscriber identity to the mobile communication device causes the mobile communication device to delete the first international mobile subscriber identity from the universal integrated circuit card, wherein the second international mobile subscriber identity is selected from among a group of international mobile subscriber identities that are designated for a mobile network operator, and wherein the second international mobile subscriber identity is selected according to the mobile network code; and
responsive to the mode of operation being the agency mode, providing, by the system, a third international mobile subscriber identity and authentication keys to the mobile communication device to cause the mobile communication device to store the third international mobile subscriber identity and the authentication keys in the universal integrated circuit card without deleting the first international mobile subscriber identity from the universal integrated circuit card.

11. The method of claim 10, wherein the providing of the second or third international mobile subscriber identity to the mobile communication device causes a second registration of the universal integrated circuit card for establishing communications for the mobile communication device, and wherein the second registration is performed without user intervention.

12. The method of claim 11, wherein the second registration causes a network element on a host core network to be updated with the second international mobile subscriber identity.

13. The method of claim 10, wherein the providing of the second or third international mobile subscriber identity to the mobile communication device is via over-the-air programming messaging utilizing short message service messaging.

14. The method of claim 10, comprising:
responsive to the mode of operation being the agency mode, detecting a failure of the universal integrated circuit card to register with a target mobile network operator utilizing the third international mobile subscriber identity and the authentication keys; and re-transmitting the third international mobile subscriber identity and the authentication keys to the mobile communication device responsive to the detecting of the failure to register with the target mobile network operator.

15. The method of claim 10, comprising:

responsive to the mode of operation being the agency mode, detecting a failure of the universal integrated circuit card to register with a target mobile network operator utilizing the third international mobile subscriber identity and the authentication keys; and providing roaming via the target mobile network operator for the mobile communication device responsive to the detecting of the failure to register with the target mobile network operator.

16. The method of claim 10, comprising providing, by the system, network adjustments to enable routing of traffic associated with the group of international mobile subscriber identities to a host core network.

17. The method of claim 10, comprising:

responsive to the mode of operation being the agency mode, detecting a failure of the universal integrated circuit card to register with a target mobile network operator utilizing the third international mobile subscriber identity and the authentication keys; and providing roaming via another mobile network operator for the mobile communication device responsive to the detecting of the failure to register with the target mobile network operator.

18. A computer-readable storage device comprising instructions which, responsive to being executed by a processor, cause the processor to perform operations comprising:

storing a first international mobile subscriber identity on a universal integrated circuit card of a mobile communication device;

responsive to a mode of operation for the mobile communication device determined to be a reseller mode, receiving a first over-the-air programming message that includes a second international mobile subscriber identity;

responsive to the mode of operation for the mobile communication device determined to be the reseller mode, storing the second international mobile subscriber identity in the universal integrated circuit card and deleting the first international mobile subscriber identity from the universal integrated circuit card, wherein the second international mobile subscriber identity is selected from among a group of international mobile subscriber identities that are designated for a mobile network operator, and wherein the selecting of the second international mobile subscriber identity is according to a mobile network code;

responsive to the mode of operation for the mobile communication device determined to be an agency mode, receiving a second over-the-air programming message that includes a third international mobile subscriber identity and authentication keys; and responsive to the mode of operation for the mobile communication device determined to be the agency mode, storing the third international mobile subscriber identity and the authentication keys in the universal integrated circuit card without deleting the first international mobile subscriber identity from the universal integrated circuit card, wherein the mode of operation for the mobile communication device is determined according to a subscriber account associated with the mobile communication device.

19. The computer-readable storage device of claim 18, wherein the operations further comprise:

performing a registration utilizing the second or third international mobile subscriber identities, wherein the registration is performed without user intervention, and wherein the first or second over-the-air programming message utilizes a short message service protocol.

20. The computer-readable storage device of claim 18, wherein the operations further comprise:

engaging in roaming via a target mobile network operator responsive to a detection of a failure to register by the mobile communication device with the target mobile network operator utilizing the third international mobile subscriber identity and the authentication keys.

* * * * *